United States Patent [19]

Urbschat

[11] Patent Number: 5,136,482
[45] Date of Patent: Aug. 4, 1992

[54] HEADLIGHT UNIT FOR VEHICLES

[75] Inventor: Ulrich Urbschat, Hamm, Fed. Rep. of Germany

[73] Assignee: Hella KG Hueck & Co., Lippstadt, Fed. Rep. of Germany

[21] Appl. No.: 789,902

[22] Filed: Nov. 12, 1991

[30] Foreign Application Priority Data

Nov. 13, 1990 [DE] Fed. Rep. of Germany ....... 4036031

[51] Int. Cl.⁵ .............................................. B60Q 1/00
[52] U.S. Cl. ........................................ 362/61; 362/243
[58] Field of Search ................................... 362/61, 243

[56] References Cited

FOREIGN PATENT DOCUMENTS 3703129 8/1988 Fed. Rep. of Germany .

Primary Examiner—Carroll B. Dority
Attorney, Agent, or Firm—Griffin, Branigan & Butler

[57] ABSTRACT

First and second reflectors are mounted in a housing covered by a light transmissive shield. The first reflector reflects substantially parallel light beams in a light exiting direction from its bulb while the second reflector is somewhat elliptically shaped and is built as a fixed optical unit with a frame which holds a collecting lens in a light beam path and a blinder, or light-blocking shield, between the second reflector and collecting lens approximately at a focus point of the collecting lens. A separate supporting member is fastened to an outer framing portion of the second reflector and has a portion extending to an apex area of the first reflector. This portion is both a receiving element for the bulb of the first reflector and a mounting element of the first reflector. Further, the separate supporting member is attached to the housing to be adjustable about at least one axis.

22 Claims, 2 Drawing Sheets

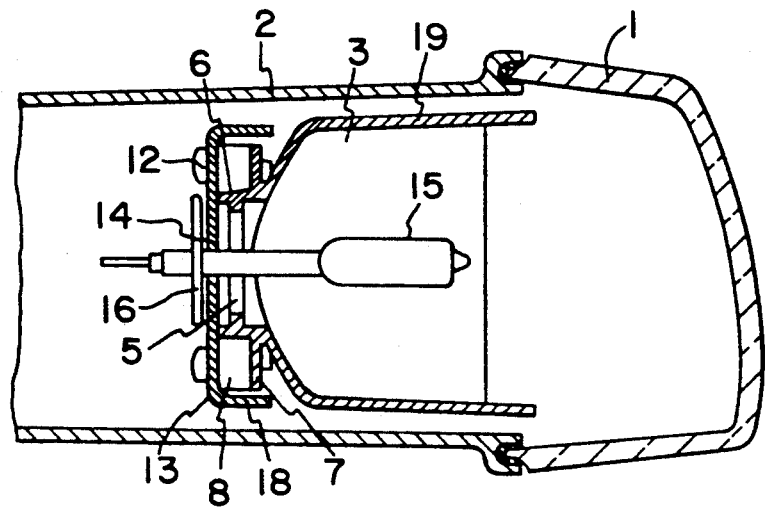
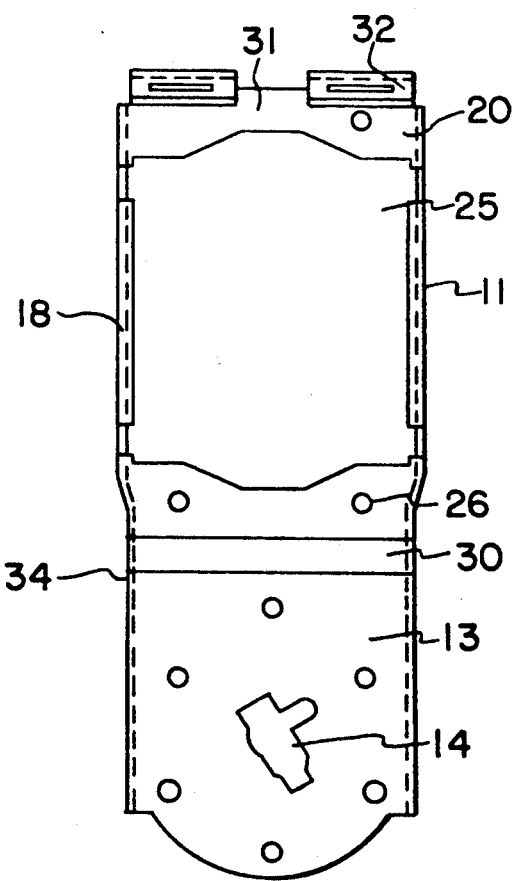

HEADLIGHT UNIT FOR VEHICLES

BACKGROUND OF THE INVENTION

This invention relates to a headlight unit for vehicles of a type in which first and second reflectors are rigidly coupled together and mounted in a common housing covered by a light transmissive shield to be adjustable about at least one axis, with the first reflector being arranged to reflect exiting light in approximately parallel beams from a bulb and the second reflector being somewhat elliptically shaped and being constructed as part of a fixed optical unit further including a frame supporting a collecting lens in a beam path and a blinder between the second reflector and the collecting lens, or condenser, approximately at a focus point of the collecting lens, with the fixed optical unit being set deeper in the housing, in a light exiting direction, than the first reflector.

In such a known headlight unit, as is described in German Offenlegungsschrift DE 37 03 129, attaching points are formed on first and second reflectors with which an immediate rigid connection between adjacent sides of both reflectors as well as connection of the first and second reflectors to a housing are produced. In this manner, each reflector is similarly a supporting member of the other reflector. Therefore, and because the second reflector forms part of a heavy optical unit including a blinder (or light-blocking shield) and a lens supported by a frame, the reflectors cannot be reliably maintained vibration-free in the housing during driving operation. In addition, stress forces can be created in reflector bowls. Further, it is disadvantageous that the reflectors, because of their specially formed attaching points for this type headlight, cannot be used for other headlight units. Both reflectors are arranged relative to one another so that the lens of the optical unit and a front frame of the first reflector are sufficiently spaced from a common-covering light-transmissive shield (their spacings therefrom being approximately the same). If the light-transmissive shield is arranged at an acute angle to the optical axis, the fastening points between both reflectors must be correspondingly differently arranged.

It is an object of this invention to provide a headlight unit of a type described in the first paragraph of claim 1 in which the first and second reflectors are attached to the housing independently of one another, that is such that one reflector is not a supporting member of the other reflector, but without substantially increasing the number of required components while at the same time a sufficiently dimensioned spacing between the lens of the optical unit and a front frame of the first reflector from the light-transmissive shield can be maintained, and further with the fastening points of the optical unit lying at a surface that is quite near to a center of gravity of the optical unit.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the drawings. The drawings are not necessarily to scale, emphasis instead being placed upon illustrating principles of the invention in a clear manner.

FIG. 2 is a cross sectional view taken on line I—I through the first reflector of FIG. 1;

FIG. 3 is a cross sectional view taken in the direction X of a supporting member of the first and second reflectors as an individual component.

DESCRIPTION OF THE PREFERRED EMBODIMENT

Figure 1:
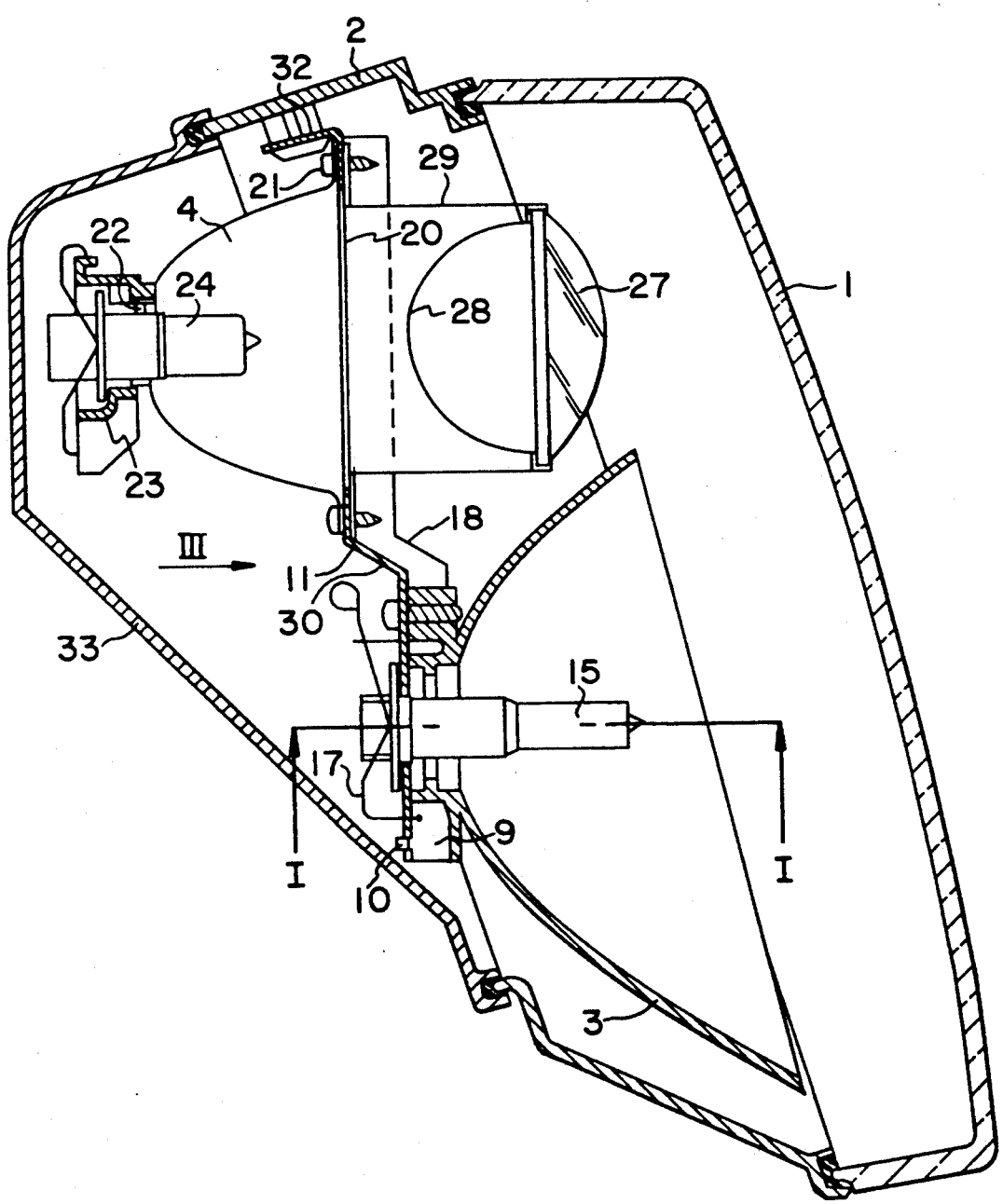
FIG. 1 is a center horizontal lengthwise cross section through a headlight unit with a parabolic formed first and an elliptically formed second reflector having features of this invention.

A parabolic formed first reflector 3 and an elliptically formed second reflector 4 are mounted in a housing 2 which is covered by a light-transmissive shield 1. The first reflector is constructed of plastic and has an opening 5 at an apex thereof which is surrounded by a rearwardly directed collar 6. A radially outwardly directed flange 7 is formed on an outer surface of the collar 6 spaced from a free end of the collar 6 to extend about the collar 6 radially outwardly. Shoulders 8 formed as hollow lugs, or plugs, are uniformly spaced about the circumference of the flange 7 on the side surface of the flange 7 directed away from the first reflector 3 whose length axes extend parallel to an optical axis of the reflector 3. Radially outwardly extending walls 9 are formed between the hollow lugs 8 on the outer side surface of the collar 6 which and on the flange 7 with narrow end surfaces thereof facing away from the reflector 3 having protrusions 10 thereon. At the surface of the collar 6 facing away from the reflector 3 a plate-like, or flat, supporting member 11 lies on the narrow end surfaces of the walls 9 and end surfaces of the lugs 8. The reflector 3 is accurately locked in position relative to the supporting member 11 by the protrusions 10 on the walls 9 which engage correspondingly sized openings in the supporting member 11. The first reflector is affixed on a portion 13 of the supporting member 11 by attaching screws 12 which pass through openings in the portion 13 and engage the hollow formed lugs, or plugs, 8. The portion 13 defines an opening 14 which overlaps, or corresponds to, the opening 5 of the first reflector 3 for receiving a bulb 15. A socket plate 16 of the bulb 15 lies on a side surface of the portion 13 of the supporting member 11 facing away from the reflector 3. The socket plate 16 is pressed by a holding spring 17, which is pivotally affixed to the portion 13, against the portion 13. The supporting member 11, which in one embodiment is formed of sheet metal, has a U-shape in cross section whereby legs 18 of the U-shape extend in a light exiting direction and a spacing between the legs is approximately the same size as a spacing between flattened areas 19 of the first reflector 3 which is substantially-rectangular in a light exiting plane (plane perpendicular to a light exiting direction). The second reflector 4, arranged adjacent the first reflector 3 is attached to a portion 20 of the supporting member 11 by means of its outer surrounding framing portion 21. The second reflector has at an apex an opening 22 and a receiving element 23 for a bulb 24. The supporting member 11 has an opening 25 with a size corresponding to a light exiting plane of the second reflector 4 and attaching openings 26 in a frame portion surrounding the opening 25 for the second reflector 4. The second reflector 4 forms, together with a lens 27 and a blinder, or light-blocking shield, 28, interconnected by a frame 29 which is attached to the outer surrounding framing portion 21 of the second reflector, an optical unit. The optical unit is, along the light exiting direction, arranged substantially deeper (further upstream) than the first reflector 3. Because of this, and because the light-transmissive shield 1 extends at an angle from the first reflector 3 toward the optical unit toward a back side of the headlight, a step 30 is placed in the supporting member between the first reflector and the second reflector so that the lens 27 of the optical unit and an outer surrounding frame of the first reflector are spaced approximately the same distance from the light-transmissive shield 1. In one of the two legs 18 of the U-shaped supporting member 11 an attaching element (not shown) is arranged which serves for attachment of the supporting member 11 to the housing. Two tongues with attaching points formed thereon are on a frame portion 31 of the supporting member 11 near the second reflector 4 for serving to attach the supporting member to the housing. The two mutually perpendicularly extending axes which extend through the attaching points, or positions, are not shown in the drawings. The housing has an opening on a rear side thereof which is covered by a cap 33.

In such a headlight unit in which the bulb receiver of the first reflector is also the supporting member of the first and second reflector, the first reflector can be arranged to have a very thin wall and thereby a correspondingly light weight. Further, both reflectors have exact positions relative to one another because the first reflector is attached to a portion of the supporting member which serves as a receiver for the bulb and an outer framing portion of the second reflector is attached to the supporting member. The outer framing portion of the second reflector has an extremely accurate position relative to the optical axis because it serves for attachment of the frame which supports the blinder and lens. Further, it is beneficial that during adjustment of both the rigidly interconnected reflectors no stress forces are created in the reflectors which deform reflection surfaces and thereby create undesired light distribution.

Beneficial further embodiments of the invention are described in the claims. According to some features of this invention, a headlight unit is provided in which the first and second reflectors as well as the bulb for the first reflector are quite firmly connectable with the supporting member. Further, the supporting member is quite uncomplicated in structure and is arranged to be quite resistant against twisting. According to some features of this invention, an extremely good heat dissipator is provided for the bulb of the first reflector by the supporting member. According to beneficial further embodiments, the headlight unit can be constructed to be quite flat in a vertical direction. According to some features of this invention, it is possible that the lens of the optical unit and the outer surrounding frame of the first reflector have a spacing from the light-transmissive shield that commonly covers the optical unit and the first reflector of a desired, or approximately the same, size. According to some features of this invention, a solution is provided by which an auxiliary adjustable reflector is adjustable in a quite exact position relative to an adjacent reflector. In beneficial further embodiments of the invention, a headlight unit is provided in which a first reflector is quite stably interconnected with a supporting member without indentations necessarily being created on its reflection surface because of its having material build up, or thickened portions. Further, the position of the first reflector is fixed quite exactly to the portion of the supporting member serving as receiving element for its bulb.

While the invention has been particularly shown and described with reference to a preferred embodiment, it will be understood by those skilled in the art that various changes in form and detail may be made therein without departing from the spirit and scope of the invention.

The embodiments of the invention in which an exclusive property or privilege are claimed are defined as follows:

I claim:

1. A headlight unit for vehicles comprising:
   bowl-shaped first and second reflectors rigidly coupled together mounted in a common housing covered by a light-transmissive shield to be adjustable about at least one axis, the reflectors each defining an opening at an apex thereof, there being a receiving element for holding a bulb at each of the openings, the first reflector being arranged to reflect exiting light beams from its bulb to be somewhat parallel, the second reflector being built as a fixed optical unit with a frame supporting a collecting lens in a beam path and a blinder between the second reflector and the collecting lens approximately at a focus point of the collecting lens, the fixed optical unit being set deeper in the housing along a light exiting direction than the first reflector; and
   a separate supporting member fastened to an outer framing portion of the second reflector and having a portion extending to an apex area of the first reflector being the receiving element for the bulb of the first reflector and being a mounting element for the first reflector, the separate supporting member being attached to the housing to be adjustable about at least one axis.

2. A headlight unit according to claim 1 wherein the portion of the supporting member for receiving the bulb has an opening which overlaps with the opening of the first reflector at which the lamp is mounted and attached.

3. A headlight unit as in claim 1 wherein a holding element for a bulb having a socket plate for the first reflector is coupled with a first reflector supporting portion of the supporting member and presses the socket plate of the bulb against a side surface of the supporting member facing away from the reflector.

4. A headlight unit as in claim 1 wherein a portion of the supporting member to which the second reflector is attached defines an opening with a frame portion to which an outer framing portion of the second reflector is attached.

5. A headlight unit as in claim 1 wherein the supporting member has a plate-like shape.

6. A headlight unit as in claim 5 wherein the supporting member is at least partially U-shaped in cross section.

7. A headlight unit as in claim 6 wherein the U-shaped support member has legs extending in a light exiting direction.

8. A headlight unit as in claim 1 wherein the supporting member is made of sheet metal.

9. A headlight unit as in claim 1 wherein the reflectors are arranged to be horizontally adjacent one another with the supporting member being vertically not substantially higher than the first and/or second reflector.

10. A headlight unit as in claim 6 wherein at least one leg of the U-shaped supporting member has an attaching element for attaching the supporting member on the housing.

11. A headlight unit as in claim 6 wherein at a rim portion of the supporting member extending laterally to a leg thereof the supporting member has at least one tab formed thereon which includes at least one or more fastening elements for fastening the supporting member to the housing.

12. A headlight unit as in claim 1 wherein the supporting member has a step positioned between the reflectors with reflector supporting portions of the supporting member being tread surfaces of the step.

13. A headlight unit as in claim 12 wherein the step in the supporting member is directed approximately along the light exiting direction.

14. A headlight unit as in claim 1 wherein one of the first and second reflectors is coupled to the supporting member to be adjustable at least about one axis.

15. A headlight unit as in claim 1 wherein the opening in the first reflector is surrounded by a collar with which the first reflector is attached to the supporting member.

16. A headlight unit according to claim 15 wherein shoulders are formed on outside surfaces of the collar for serving to fasten the first reflector to the supporting member.

17. A headlight unit as in claim 15 wherein attaching elements are supported by a radially outwardly directed flange formed to surround an outside surface of the collar.

18. A headlight unit as in claim 16 wherein the shoulders are formed on side surfaces of the flange facing away from the first reflector.

19. A headlight unit as in claim 16 wherein the shoulders are formed as hollow lugs in which an attaching means for attaching the first reflector to the supporting member is engaged.

20. A headlight unit as in claim 19 wherein the attaching means are screws.

21. A headlight unit as in claim 15 wherein radially outwardly extending walls are formed on an outside surface of the collar having protrusions at narrow end surfaces facing away from the first reflector which engage in openings of corresponding sizes in the supporting member.

22. A headlight unit as in claim 17 wherein the shoulders are formed on side surfaces of the flange facing away from the first reflector.

* * * * *